United States Patent [19]

Deceased et al.

[11] Patent Number: 4,839,453

[45] Date of Patent: * Jun. 13, 1989

[54] NOVEL SCAVENGERS FOR ONE-COMPONENT RTV COMPOSITIONS

[75] Inventors: Rack H. Chung, deceased, late of Clifton Park N.Y., by Besty A. Chung, executrix; Roger T. Swiger, Schenectady, N.Y.; Melvin D. Beers, Hudson, Ohio

[73] Assignee: General Electric Company, Waterford, N.Y.

[*] Notice: The portion of the term of this patent subsequent to Jan. 19, 2005 has been disclaimed.

[21] Appl. No.: 113,411

[22] Filed: Oct. 21, 1987

Related U.S. Application Data

[60] Division of Ser. No. 912,641, Sep. 25, 1986, Pat. No. 4,720,531, Continuation of Ser. No. 428,038, Sep. 29, 1982, abandoned.

[51] Int. Cl.$^4$ .............................................. C08G 77/06
[52] U.S. Cl. ........................................ 528/18; 528/15; 528/17; 528/19; 528/21; 528/23; 528/33; 528/34; 528/901
[58] Field of Search ................ 528/18, 15, 17, 19, 528/21, 34, 23, 33, 901

[56] References Cited

U.S. PATENT DOCUMENTS

| | | | |
|---|---|---|---|
| 3,065,194 | 11/1962 | Nitzsche et al. | 524/788 |
| 3,127,363 | 3/1964 | Nitzsche et al. | 424/78 |
| 3,334,067 | 8/1967 | Weyenberg | 528/17 |
| 3,542,901 | 11/1970 | Cooper et al. | 528/33 |
| 4,100,129 | 7/1978 | Beers | 528/34 |
| 4,180,642 | 12/1979 | Takago | 528/32 |
| 4,248,993 | 2/1981 | Takago | 528/38 |
| 4,377,706 | 6/1981 | Halgren | 556/482 |
| 4,395,526 | 6/1981 | White et al. | 528/34 |
| 4,417,042 | 2/1982 | Dziark | 528/18 |
| 4,424,157 | 1/1982 | Chung | 260/239.3 R |
| 4,483,973 | 2/1982 | Lucas et al. | 528/21 |
| 4,513,115 | 2/1982 | Beers | 524/731 |
| 4,720,531 | 1/1988 | Chung et al. | 528/23 |

FOREIGN PATENT DOCUMENTS

1581856 12/1980 United Kingdom .

OTHER PUBLICATIONS

Chemistry of Organic Compounds Relevant to the meaning of guanidine, Carl R. Noller 3rd Edition 1965.
An Introduction to the Chemistry Relevant to the meaning of silazane, of the Silicones E. R. Rochow 2nd Edition (date unavailable).

Primary Examiner—Melvyn I. Marquis

[57] ABSTRACT

A novel, shelf-stable, one-component alkoxy-functional RTV composition having therein as a scavenger an alkoxy-functional silazane compound. The silazane compound can be cyclic or linear and can also be an integrated cross-linking agent.

20 Claims, No Drawings

NOVEL SCAVENGERS FOR ONE-COMPONENT RTV COMPOSITIONS

This application is a division of application Ser. No. 912,641, filed 09/25/86, now U.S. Pat. No. 4,720,531, which is a continuation of Ser. No. 428,038, filed 09/29/82, now abandoned.

BACKGROUND OF THE INVENTION

The present invention relates to alkoxy-functional RTV compositions, and more particularly, the present invention relates to alkoxy-functional, one-component, RTV compositions having novel scavengers which scavengers can also be utilized as cross-linking agents in some cases. (RTV in this patent application refers to room temperature vulcanizable.)

One-component and two-component, alkoxy-functional RTV compositions are well known. See, for instance, the disclosures of Beers, U.S. Pat. No. 4,100,129, Nitzsche et al., U.S. Pat. No. 3,127,363, and Nitzsche et al., U.S. Pat. No. 3,065,194. Recently, there has been discovered or invented, novel one-component, alkoxy-functional, RTV compositions which are shelf stable. It is postulated that in previous alkoxy-functional, one-component, RTV compositions, that the composition after being prepared and upon standing, and as a result of having excess hydroxy groups in the polymer mixtures, the polymer mixture would degrade such that it would not cure at a sufficient rate after having been stored for any substantial period of time such as a month or more. Even if such a composition would cure after prolonged storage, still the cured composition did not achieve its maximum or optimum physical properties. It should be noted that even commerical, one-component, alkoxy-functional, RTV compositions, such as that of Beers, U.S. Pat. No. 4,100,129 mentioned above, suffered to some extent from this problem.

The hypothesis for the reasons for the problem as well as the solutions to the problem, i.e., shelf-stable, one-component, alkoxy-functional, RTV system, is to be found more fully set forth in White et al., U.S. Pat. No. 4,395,526 which is hereby incorporated by reference. A related case is Halgren, U.S. Pat. No. 4,377,706. Basically, the patents, and particularly, White et al., disclose the use of scavengers and integrated scavengers and cross-linkers having certain types of functionality to be utilized to absorb or react with all or most of the hydroxy groups in the polymer mixture such that the polymer mixture will remain shelf-stable.

Other related applications that have been filed since the filing of the White et al. case are for instance, Chung, Ser. No. 338,518, filed Jan. 11, 1982, now U.S. Pat. No. 4,424,157. The Chung case relates to the use of cyclic amides or novel cyclic amide compounds as scavengers and integrated cross-linking agents for the RTV systems of White et al.

Since that time, there have also been filed Beers, U.S. Pat. No. 4,513,115, Lucas et al., U.S. Pat. No. 4,483,973, and Dziark, U.S. Pat. No. 4,417,042. The Beers patent, relates to the use of various ingredients in the composition to render the composition low-modulus with good self-bonding properties. The patent of Lucas et al. relates to the use of certain novel, self-bonding additives for the RTV composition of White et al. Finally, the Dziark patent, U.S. Pat. No. 4,417,042, relates to the use of certain silazane compounds as scavengers for the basic RTV compositions disclosed in White et al. However, it should be noted that the silazane compounds of Dziark, U.S. Pat. No. 4,417,042, are solely scavengers. That is, they are utilized after the alkoxy-terminated, diorganopolysiloxane polymer is first formed. After it is formed, then the silazane scavengers of Dziark, are added. These silazane compounds of Dziark, most of which are well known, react with the hydroxy groups in the polymer mixture and tie them up such that they cannot react or further cross-link to degrade the basic polymer that is needed in the system. Further, in the compositions of Dziark, as disclosed in one aspect in White et al., the alkoxy-terminated diorganopolysiloxane polymer has to be formed first, by reacting a silanol-terminated diorganopolysiloxane polymer with an alkyl trialkoxysilane in the presence of an amine. Then once the multialkoxy-terminated diorganopolysiloxane polymer is formed, the scavenger can be added to the system along with the other ingredients to react with all the hydroxy groups in the RTV system.

The silazane scavengers of Dziark suffer from the fact that they cannot be utilized as cross-linkers; that is, they can be used only as scavengers. As noted in White, et al., it is desirable also in many cases to have integrated cross-linker scavengers, which materials can act both as scavengers and as cross-linking agents, for the White et al. RTV systems.

Accordingly, it was highly desirable to find silazane cross-linker scavenger compounds which could be utilized in the White et al. systems. Specifically, silazane scavengers and silazane integrated cross-linkers as scavengers are desirable since they are inexpensive to make, they give a by-product of ammonia when they react with the hydroxy groups which ammonia is innocuous. Another advantage of such silazane scavengers and integrated cross-linkers is that only a small amount of such compounds is needed to effect the necessary tying up of the hydroxy groups in the polymer system. This results from the high functionality of the silazane compounds and the nitrogen agents that tie up or bond with the hydroxy groups in the polymer systems.

Accordingly, it is one object of the present invention to provide for novel silazane scavengers for alkoxy-functional, one-component, RTV systems.

It is another object of the present invention to provide for novel integrated cross-linkers, scavengers for alkoxy-functional, one-component, RTV systems.

It is still an additional object to provide for alkoxy-functional silazane which can be utilized either as a scavenger or as an integrated scavenger, cross-linking agent for alkoxy-functional, one-component, RTV systems.

It is still an additional object of the present invention to provide a method for producing shelf-stable, alkoxy-functional, one-component, RTV systems by including in the composition an alkoxy-functional silazane which can act both as a scavenger and, if desired, as an integrated cross-linking agent and scavenger.

It is yet still a further object of the present invention to provide a method for producing a shelf-stable, alkoxy-functional, one-component, RTV system by incorporating in the composition, an alkoxy-functional silazane which can act either as a scavenger or as an integrated cross-linker scavenger for the systems.

These and other objects of the present invention are accomplished by the disclosures set forth herein below.

SUMMARY OF THE INVENTION

In accordance with the above objects, there is provided by the present invention, a stable, one-package, substantially anhydrous and substantially acid-free, room temperature, vulcanizable, organopolysiloxane composition, stable under ambient conditions, in the substantial absence of moisture over an extended period of time, and convertible to a tack-free elastomer comprising:

(A) an organopolysiloxane where the silicon atom at each polymer chain end is terminated with at least 2 alkoxy radicals;

(B) an effective amount of a condensation catalyst;

(C) a stabilizing amount of scavenger for hydroxy functional groups selected from the class consisting of a non-cyclic silyl nitrogen scavenger of the formula,

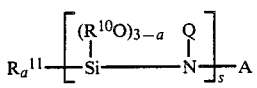 (1)

and cyclic silyl nitrogen scavengers having at least one or all of the units of the formula,

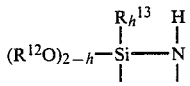 (2)

and the rest of the units if any, having the formula

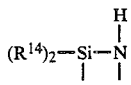 (3)

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical; Q is selected from hydrogen, $C_{1-8}$ monovalent substituted or unsubstituted hydrocarbon radicals and radicals of the formula

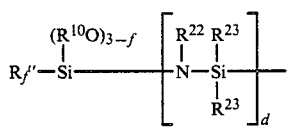 (4)

where $R^{10}$, $R^{11}$ are as previously defined, where a varies from 0 to 2 where f varies from 0 to 3, h is 0 or 1, where s is a whole number that varies from 1 to 25, d is a whole number that varies from 1 to 25, $R^{22}$ is selected from hydrogen and $C_{1-8}$ monovalent hydrocarbon radicals and $R^{23}$ is independently selected from $C_{1-8}$ monovalent hydrocarbonoxy and hydrocarbonoxy radicals, A is selected from the class consisting of hydrogen and $C_{1-8}$ monovalent substituted or unsubstituted hydrocarbon radicals and a radical of the formula

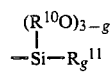 (5)

where $R^{10}$, $R^{11}$ are as previously defined, g varies from 0 to 3 and in the above scavengers there is at least one hydrocarbonoxy group in the molecule, $R^{12}$ is defined the same as $R^{10}$, and $R^{13}$ is defined the same as $R^{11}$, and $R^{14}$ is defined the same as $R^{11}$, and optionally (D) an effective amount of a curing accelerator selected from the group consisting of substituted guanidines, amines, and mixtures thereof.

In the case when it is desired to have an integrated cross-linker scavenger compound in the RTV system, the same compounds as disclosed above may be utilized, except in such compounds there are at least three alkoxy groups or hydrocarbonoxy groups in the linear, or one alkoxy group in the cyclic on each silicon atom. For s=1, where Q is hydrogen, generally there are at least three or four alkoxy groups in the compound for the compound to function as an integrated cross-linker scavenger. For polymers where s is greater than 1, and Q is of Formula (4), preferably for the polymer to function both as an integrated cross-linker and scavenger there should be at least two hydrocarbonoxy groups on each terminal silicon atom and at least one hydrocarbonoxy group on each internal silicon atom. However, generally the compound will still function as an integrated cross-linker, even if some of the silicon atoms in the polymer, whether terminal or not, have less than the preferred number of hydrocarbonoxy groups. Three, two or one alkoxy groups in the compound result in it acting effectively as a scavenger, but unfortunately, it does not always have sufficient alkoxy-functionality for it to impart to the composition necessary cross-linking capabilities. Further, these alkoxy compounds can all be made by traditional processes disclosed in the present case or as disclosed in Dziark, U.S. Pat. No. 4,417,042, referred to previously.

DESCRIPTION OF THE PREFERRED EMBODIMENT

In the formula of the linear or branch-chained, non-cyclic, silyl nitrogen scavenger, the radical $R^{10}$ can be selected from alkyl radicals such as methyl, ethyl, propyl, etc.; alkylether radicals such as methylmethylether, methylethylether, methylpropylether, ethylethylether, ethylpropylether, 2-methoxyethyl, 2-ethyoxyethyl, 2-propoxymethyl, etc.; alkylester radicals such as methyl ester, ethyl ester, propyl ester, butyl ester, 2-acetoxyethyl, 2-acetoxypropyl, etc.; alkylketone radicals such as 1-butan-3-onyl, methyl methyl ketone, methyl ethyl ketone, ethyl methyl ketone, ethyl ethylketone, etc.; and alkylcyano radicals such as methyl nitrile; and aryl radicals such as phenyl, meythylphenyl, etc. Basically, the $R^{10}$ radical can be any alkyl and phenyl radical of 1-8 carbon atoms, and more preferably one of the radicals disclosed above. Most preferably, $R^{10}$ is methyl. In the compound of Formula (1), $R^{11}$ and $R^{23}$ are independently selected from $C_{1-8}$ monovalent substituted or unsubstituted hydrocarbon radical such as an alkyl radical such as methyl, ethyl, propyl, etc.; a cycloalkyl radical such as cyclohexyl, cycloheptyl, etc.; an olefinic radical such as vinyl, allyl, etc.; a mononuclear aryl radical such as phenyl, methylphenyl, ethylphenyl, et.; or a substituted hydrocarbon radical such as fluoroalkyl radical, such as 3,3,3-trifluoropropyl. The radical $R^{22}$ is selected from the same radicals and hydrogen.

Accordingly, preferably $R^{11}$ is selected from an alkyl radical of 1–8 carbon atoms and is most preferably methyl. The radical Q is most preferably hydrogen. Alternatively, the radical Q can be selected from any $C_{1-8}$ monovalent substituted or unsubstituted hydrocarbon radicals which can be any of the radicals defined for $R^{11}$ with the caveat that desirably, there are no more than eight carbon atoms in the radical.

The other part of the definition of the compound of Formula (1) is that a varies from 0 to 2 and f varies from 0 to 3, where Q is selected from hydrogen and $C_{1-8}$ monovalent hydrocarbon radicals, and where the sum of a+f does not exceed 5, there is at least one alkoxy radical in the compound of Formula (1). The reason for the restrictions on a and f is so that they will be in accordance with the description of the silazane compounds of the instant invention, and that there will be at least one alkoxy group in the molecule. It should be noted that the manner in which the compounds of the present invention distinguish over the compounds of Dziark, U.S. Pat. No. 4,417,042, is that the compounds of the instant invention have hydrocarbonoxy groups in them. The compounds of Dziark do not have hydrocarbonoxy groups in them. The advantages of the hydrocarbonoxy groups of the instant case have been set forth previously. Further, in the definition of the compound of Formula (1) is that preferably s is a whole number that varies from 1-25, and is most preferably 1-10, and d is preferably a whole number that varies from 1-25, and is most preferably 1-5. It should be noted that the simpler alkoxy silazane compounds are the desirable ones since they are the easiest to obtain and are the ones that are obtained in maximum yield. However, the higher molecular weight hydrocarbonoxy silazane compounds can also be utilized in the instant invention within the scope of the above formulas.

Further, in the foregoing Formula (1), A is preferably selected from the class consisting of hydrogen and the same $C_{1-8}$ monovalent substituted or unsubstituted hydrocarbon radicals as were defined previously for $R^{11}$. Most preferably, A can be selected from hydrogen, methyl, ethyl, —Si(CH$_3$)$_3$, —Si(OCH$_3$)(CH$_3$)$_2$,
—Si(OCH$_3$)$_2$(CH$_3$), —Si(OCH$_3$)$_3$.

In the compounds of the foregoing Formulas (1) to (4), it is preferred that in one embodiment when the silazane compound is a scavenger, that $R^{10}$ and $R^{11}$ be methyl, and the O radical be hydrogen. Accordingly, in one embodiment, preferably the scavenger has the formula

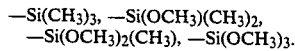

In another embodiment of the linear branch-chained hydrocarbonoxy silazane compounds of the instant case, it is preferred that the instant compound be a compound having the formula

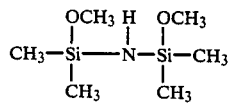

Another preferred compound within the scope of the above formula is divinyltetramethoxydisilazane. Other preferred compounds within the scope of the above formulas are, for instance,

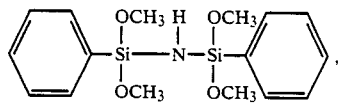

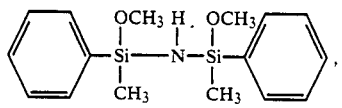

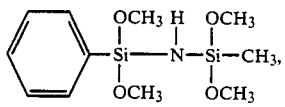

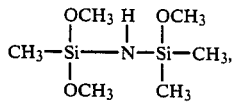

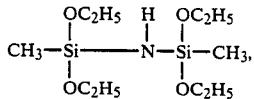

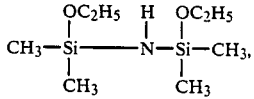

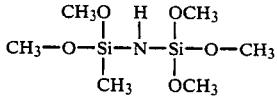

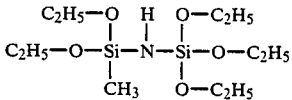

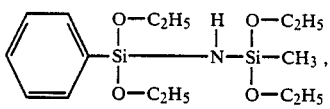

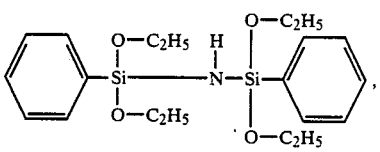

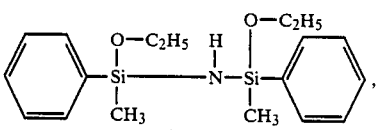

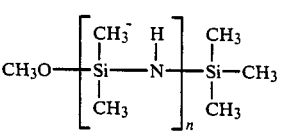

n = 1–5 and mixtures thereof

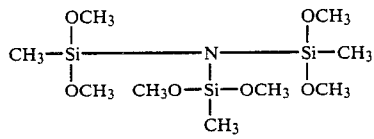

1-Methyl-3-ethyl-1,1,3,3-tetramethoxydisilazane
1,3-Diethyl-1,1,3,3-tetramethoxydisilazane
1-Methyl-3-propyl-1,1,3,3-tetramethoxydisilazane
1-Ethyl-3-propyl-1,1,3,3-tetramethoxydisilazane
1,3-Dipropyl-1,1,3,3-tetramethoxydisilazane
1,1,3-Trimethyl-1,3,3-trimethoxydisilazane
1,1-Dimethyl-3-ethyl-1,3,3-trimethoxydisilazane
1,1-Dimethyl-3-propyl-1,3,3-trimethoxydisilazane
1,1-Dimethyl-3-butyl-1,3,3-trimethoxydisilazane
1,1-Diethyl-3-methyl-1,3,3-trimethoxydisilazane
1,1-Dipropyl-3-methyl-1,3,3-trimethoxydisilazane
1,1-Dibutyl-3-methyl-1,3,3-trimethoxydisilazane
1,1,3-Trimethyl-1,3,3-trimethoxydisilazane
1,1,3-Triethyl-1,3,3-trimethoxydisilazane
1,1,3-Tripropyl-1,3,3-Trimethoxydisilazane
1,1-Dimethyl-1,3,3,3-Tetramethoxydisilazane
1,1-Diethyl-1,3,3,3-Tetramethoxydisilazane
1,1-Dipropyl-1,3,3,3-Tetramethoxydisilazane
1,3-Dimethyl-1-ethyoxyl-1,3,3-trimethoxydisilazane
1,3-Diethyl-1-ethoxy-1,3,3-trimethoxydisilazane In addition to the above, linear and branch-chained, non-cyclic silazane compounds, there can be utilized alkoxy-functional cyclic silazane compounds in the instant invention. Accordingly, there can be a cyclic silyl nitrogen scavenger having at least one or all of its units, units of Formula (2) and the rest of the units, if any, having Formula (3). Preferably, the compound is made up of units of Formula (2); however, the cyclic compound may have units of Formula (2) interspersed with Formula (3). However, the caveat holds that the cyclic compound must have at least one hydrocarbonoxy or alkoxy group in the compound as well as be a cyclic silazane compound to be utilized in the instant invention. Preferably, all of the units in the silyl nitrogen compound are selected from those of Formula 2. Preferred cyclic silazane compounds within the scope of the above formulas, are for instance,

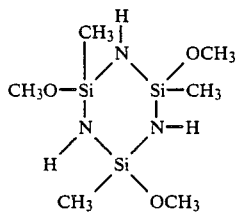

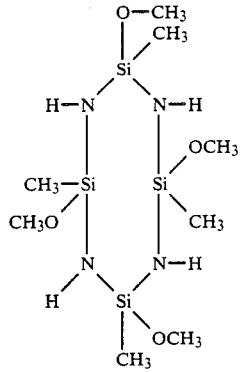

Other preferred compounds within the scope of the cyclic silazanes of the instant case, are for instance, those of Formulas

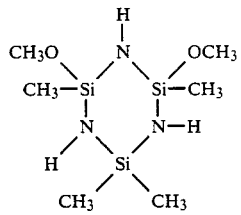

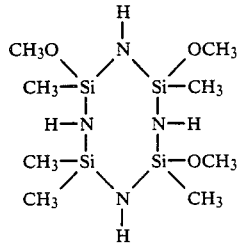

Other preferred cyclic compounds within the scope the instant case are compounds of the following formulas.

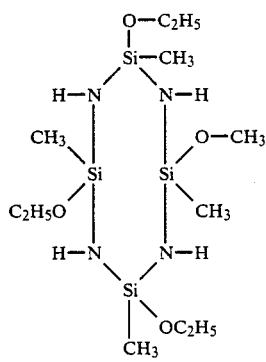

-continued

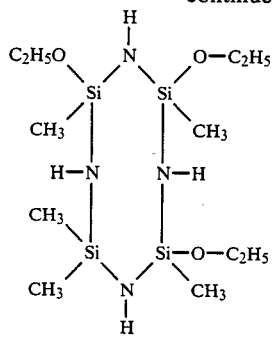

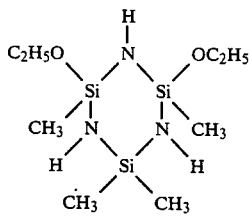

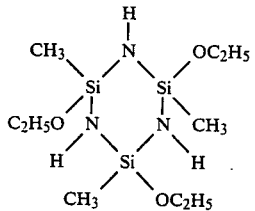

2,4,6-Triethyl-2,4,6-trimethoxycyclotrisilazane
2,4,6-Trimethyl-2,4,6-trimethoxycyclotrisilazane
2,4,6-Tripropyl-2,4,6-trimethoxycyclotrisilazane
2,4-Dimethyl-6-ethyl-2,4,6-trimethoxycyclotrisilazane
2-Methyl-4,6-diethyl-2,4,6-trimethoxycyclotrisilazane
2,4-Dimethyl-6-propyl-2,4,6-trimethoxycyclotrisilazane
2-Methyl-4,6,dipropyl-2,4,6-trimethyoxycyclotrisilazane
2,4,6-trivinyl-2,4,6-trimethoxycyclotrisilazane
2,4-Dimethyl-6-vinyl-2,4,6-trimethoxycyclotrisilazane
2,4-Dimethyl-1-phenyl-2,4,6-trimethoxycyclotrisiliazane
2,4,6,8-Tetraethyl-2,4,6,8-tetramethoxycyclotetrasilazane
2,4,6,8-Tetramethyl-2,4,6,8-tetraethoxycyclotetrasilazane
2,4,6,8-tetrapropyl-2,4,6,8-tetramethoxycyclotetrasilazane
2,4,6-Trimethyl-8-ethyl-2,4,6,8-tetramethoxycyclotetrasilazane
2,4,6-trimethyl-8-propyl-2,4,6,8-tetramethoxycyclotetrasilazane
2,4-Dimethyl-6,8-diethyl-2,4,6,8-tetramethoxycyclotetrasilazane
2,6-Dimethyl-4,8-diethyl-2,4,6,8-tetramethoxycyclotetrasilazane
2,4,6,8-tetravinyl-2,4,6,8-tetramethoxycyclotetrasilazane
2,6-dimethyl-4,8-divinyl-2,4,6,8-tetramethoxycyclotetrasilazane 2,4,6-Trimethyl-8-vinyl-2,4,6,8-tetramethoxycyclotetrasilazane It should be noted that in the instant application, there is a distinction between hydrocarbonoxy silazane compounds, whether linear or cyclic, which have at least one hydrocarbonoxy group in them and those that have at least three and preferably four hydrocarbonoxy groups in them, where $S=1$, $Q=H$. The compounds that have at least one—but less than three or four alkoxy groups—can be utilized as scavengers only. Those hydrocarbonoxy silizane compounds of the instant case, $S-1$, $Q=H$, which have at least three or four hydrocarbonoxy groups in the molecules can be utilized both as scavengers and integrated cross-linkers; i.e., the compound, if utilized in the proper quantities, will tie up hydroxy groups in the polymer mixture as well as act as a cross-linking agent to cross-link the base silanol material so as to form an alkoxy endcapped diorganopolysiloxane polymer, which, upon exposure to atmospheric moisture, will hydrolyze to form a silicone elastomer.

For silazane polymer compound that is where s and d are greater than 1, it is preferred that there be at least two hydrocarbonoxy groups in the terminal silicon atoms as well as at least one hydroxycarbonoxy group in each internal silicon atom for the compound to function as an intergrated cross-linker. However, the compound will still function as an integrated cross-linker even if some silicon atoms including terminal silicon atoms are without hydrocarbonoxy or alkoxy group. Further, if most of the silicon atoms have an alkoxy group in the compound, then it functions as an integrated cross-linker, even if the terminal silicon atom has no alkoxy group or just one alkoxy group per silicon atom. Further, the compound can function as an integrated cross-linker if it is a mixture of polymer species in which most of the polymer species meet the above conditions.

It should be noted further that the compound having at least three hydrocarbonoxy groups in it can also be utilized as a scavenger irrespective of whether it functions as a cross-linker. In any case, when there is utilized a cross-linker, and the silazane compound has at least three or four hydrocarbonoxy groups in it, as explained above, some of the hydrocarbonoxy silazane compound will function as a cross-linking agent as well as a scavenger due to the statistical reactivity results of the composition.

In this respect, it should be noted that the hydrocarbonoxy silazane compound which has less than two hydrocarbonoxy groups in it can only function as a scavenger, and, accordingly, must be utilized with this concept in mind. There are some compounds with $s=1$, $Q=H$ with only two hydrocarbonoxy groups in which both groups are on the same silicon atom in which half of the compound can function as integrated cross-linker. However, generally most silazane compounds within the instant invention with only 2 hydrocarbonoxy groups in it when $s=1$, $Q=H$ cannot function as an integrated cross-linker. With respect to quantities of the compound to be utilized, this is discussed elsewhere in the case, but as a guide there may be utilized per 100 parts by weight of the silanol polymer, 1 to 12, and more preferably from 3 to 7, of a hydrocarbonoxy silazane compound. In the case where the hydrocarbonoxy silazane compound functions both as a cross-linking agent and as a scavenger, then per 100 parts by weight of the base silanol polymer, there is generally utilized 2.0 to 12 parts of the hydrocarbonoxy silazane compound, and preferably 3 to 8 parts of such compounds per 100 parts of the base silanol polymer. These concentration ranges are general especially in the second case because how much of the hydrocarbonoxy compound that is used as both a cross-linking agent and a scavenger will depend on the amount of hydrocarbonoxy groups in the molecules of such hydrocarbonoxy silazane compounds. Further, the cyclic silazane compound can be any cyclic silazane, but most preferably it is a trisilizane or tetrasilazane since these are the most readily available cyclic silazanes. However, it can also be a pentasilazane or higher cyclosilazane. It must be appreciated as will be explained below, in the normal course of producing such cyclic silazanes, that most of the compounds that are produced are cyclic tetrasilazanes and cyclictrisilazanes. However, some higher cyclic silazanes are also produced and these higher cyclic silazanes in the mixture along with the cyclic trisilazanes and cyclotetrasilazane can be utilized as scavengers or as both scavengers and cross-linking agents in the instant invention, depending on their hydrocarbonoxy functionality as is described below.

Further, it should be noted when the linear disilazane is prepared, there is produced along with it in accordance with current processes, some of the trisilazane whose formula was given above.

The reason for the fact that there must be the number of hydrocarbonoxy groups in the silazane molecules as explained above in order for the silazanes to function as a cross-linking agent as well as a scavenger, is that it is desirable that when the endcapping group ties up the silanol group at the terminal end of the polymer that there is appended to the silyl group at least two alkoxy groups. If this is the case, that is, most of the polymer is terminated by at least two hydrocarbonoxy or alkoxy group, then such terminated base polymer will be shelf-stable and effectively cross-link to produce a shelf-stable composition. The rest of the hydrocarbonoxy silazane can simply function to tie up other hydroxy groups in the polymer mixture that are present other than the hydroxy groups at the terminal end of the silanol-terminated diorganopolysiloxane base polymer. Further, as stated previously, while the above concentration ranges have been given for the silazane compounds, both in the case when they are utilized as scavengers only or when they are utilized as scavengers and cross-linking agents, these concentrations are just general guides and are not critical. What is important is that there be a minimum amount of silazane compound irrespective of whether it is to function as a scavenger only or both as a scavenger and an integrated cross-linker. Accordingly, this minimum amount of silazane compound is at least 3% excess over the stoichiometric amount needed to react with all the excess water and all the excess hydroxy groups in the polymer mixture, and generally, in most compositions, can be set at the level of at least one part by weight of scavenging silazane compound per 100 parts of the base silanol end-stopped diorganopolysiloxane polymer.

Proceeding first to the linear end branch-chained non-cyclic silazanes, these can be made by a well-known procedure. First of all, there may be taken the appropriate chlorosilane and reacted with an aliphatic alcohol to alkoxylate the desired amount of chlorine groups in the chlorosilane. Generally, this reaction takes place at from 0° to 50° C. and more preferably takes place at a temperature from 0° to 25° C. The time of a reaction can be anywhere from 12 to 24 hours and is more preferably 12 to 16 hours. There results about an 80% yield of the alkoxylated desired product. Once the alkoxylated silane is obtained with the desired amount of alkoxylation, there is obtained an alkoxy-functional chlorosilane. It should be noted there can also be used a completely alkoxylated silane or monoalkoxy silane or dialkoxymonoalkylsilane depending on the type of product desired. These intermediates are taken and there is bubbled ammonia through them. Preferably, the temperature of reaction is kept from 0° to 60° C. if it is desired to obtain a high yield of the lower molecular weight silyl nitrogen compounds. If the temperature is raised above 60° C., then a higher percentage of the higher molecular weight silyl nitrogen compounds are obtained. Also, the reactant, i.e., the silane may be dissolved in a common solvent that is utilized in such reactions. Examples of such solvents are organic, hydrocarbon solvents: ether solvents such as dioxane, furane; chloroaliphatic hydrocarbon solvents such as trichloroethylene; aromatic hydrocarbon solvents such as xylene, toluene, benzene; and aliphatic hydrocarbon solvents such as hexane, heptane, etc. A sufficient amount of solvent is utilized to dissolve the chlorosilane so that the ammonia can be completely bubbled through the solution. It must be appreciated that while the description above has been with respect to chlorosilanes, other types of halosilanes may be utilized as reactants; however, the chlorosilanes are the most readily available. The reaction generally takes place for a period of time varying from 2 to 12 hours and more preferably from 4 to 6 hours, and depending on how much ammonia gas is utilized and the stoichiometry of the reaction, there will be obtained different types of silyl nitrogen compounds—linear or branch-chained. If linear non-cyclic silazane compounds are desired, then preferably there is utilized a certain amount of the monochlorosilanes as well as the dichlorosilanes. Depending on the amount of the ammonia that is bubbled through the mixture, the temperature of reaction and most importantly the stoichiometry of the reactants there can be obtained different types of silyl nitrogen compounds. As noted before, if the temperature is kept below 60° C. and the appropriate stoichiometry is used, most of the compounds that will be yielded will be disilazane compounds. If higher temperatures are utilized, there will be larger amounts obtained of the higher silyl nitrogen compounds. Further, if elevated pressures are used and especially pressures in the range of 10 to 50 psig, then there will be obtained more of the higher silyl nitrogen compounds than is the case when atmospheric pressure is utilized.

Accordingly, the process variables can be varied to obtain the type of silyl nitrogen which is most desired. For the purpose of the instant process, or for ease of synthesizing as well as for suitability in the instant invention, the most desirable silazane compounds are the ones with the lowest molecular weight, and, accordingly, the simplest to obtain, are the disilazane compounds. However, if expense and time is not a factor, then there is no reason why the higher silyl nitrogen compounds may not be obtained. With respect to the obtainment of the cyclic silazane compound as distinguished from the linear silazane compounds, then again the same rules apply except that the reactants are strictly dichlorosilanes.

Ammonia is bubbled through the reaction mixture once the alkoxylated product is dissolved in one of the organic solvents disclosed above, and the pressure and the temperature may be varied in accordance with the above limitations and definitions to obtain more of the cyclotrisilazane, or more of the higher cyclic silazanes if desired. That is, if the temperature is maintained at 60° C. or below, and the pressure is atmospheric pressure, then there will be obtained more of the cyclotrisilazane. If higher pressures are utilized and the temperature is raised above 60° C. in the process, there will be obtained considerably more of the higher cyclicsilazanes. As noted previously, the preferred cyclic silazanes in the instant invention are the cyclic trisilazanes and the cyclic tetrasilazanes. Accordingly, unless there is some other reason why the higher cyclic silazanes are desired, then the cyclic trisilazanes and cyclic tetrasilazanes can be synthesized by the most inexpensive procedure and may be utilized in the instant process.

Another point to be made is that in the production of cyclic silazanes there will normally be produced a mixture of cyclic silazanes in which most of the mixture is comprised of cyclic trisilazanes and cyclic tetrasilazanes and the rest are the higher cyclic silazanes.

In such a situation, it is desirable to use the entire mixture of the cyclic silazanes as scavengers or integrated scavengers and cross-linkers in the instant case rather than to go to the expense and process of purifying and separating the individual cyclic silazanes and using them individually in the instant case. It is only necessary to know in terms of functionality what the alkoxy content of the mixture is. This will be obtained by knowing the alkoxy content of the reactant. It should also be appreciated that if it is desired to have cyclic silazanes having units in them of Formulas (2) and (3), then desirably, there is reacted an alkoxylated dichlorosilane with a non-alkoxylated silane in the specified proportions. It should be noted that in this application, unless specified otherwise, hydrocarbonoxy and alkoxy are utilized interchangeably—both terms being utilized to define a hydrocarbon oxygenated group substituent group.

The above processes as have been described above, can be followed by a worker skilled in the art to produce an alkoxysilazane compound of the instant case. However, for more background in this area of producing silazane compounds, one is referred to the disclosure of British Pat. No. 1,581,856, which relates to the production of alkoxysilazane compounds. However, the disclosure of these references is meant to be given as background since in one case the disclosure does not relate to hydrocarbonoxysilazane compounds, and in the other case, the process is directed to specific types of hydrocarbonoxy silazane compounds.

As noted, such silazane compounds may be utilized as scavengers with an already formed alkoxy-terminated diorganopolysiloxane polymer which is preferably formed by reacting a silanol-terminated diorganopolysiloxane polymer with a cross-linking agent such as methyltrimethoxysilane in the presence of an amine and preferably in the presence of n-dihexylamine which catalyzes the endcapping of the polymer. Once the end-capped polymer is formed, then the scavenging silazane compounds of the instant case can be added as scavengers solely in the specified amounts either before all of the other ingredients are added or with the other ingredients so as to bond or tie up hydroxy groups in the compound mixture.

Alternatively, the scavenging and integrated cross-linking compounds of the instant case can be added to the base silanol endstopped diorganopolysiloxane polymer either alone so as to endcap the polymer or together into other ingredients so as to produce the desired endcapped polymer, i.e., the polymer that is endcapped with alkoxy groups—preferably at least two alkoxy groups in most cases—and in which the scavenging also ties up all unbonded hydroxy groups in the compound mixture. Once this has been accomplished the composition can be packaged in substantially anhydrous state and is ready to be utilized by the consumer or in industry as the case may be. There will now be a recitation of the compositions of the White et al. case and the various types of compositions defined in the White el al. patent. This recitation is given to define all of the areas in which the present scavenging and scavenging-cross-linking agents may be utilized and all the different alkoxy-functional one-component, RTV compositions that the present scavenging or scavenging and integrated cross-linkers may be utilized as concerns the RTV compositions of White et al.

The base silanol-terminated polydiorganosiloxane has the formula

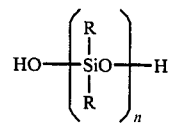 (6)

where R is a $C_{1-13}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

As utilized herein, the term "stable" as applied to the one-package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

The present invention is based on the discovery that stable, substantially acid-free, one-package, moisture curable polyalkoxy-terminated organopolysiloxane RTV compositions can be made by using a silanol terminated polydiorganosiloxane consisting essentially of chemically combined diorganosiloxy units of the formula

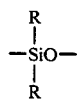 (7)

such as a silanol-terminated polydiorganosiloxane of Formula (6), where R is as previously defined, with an effective amount of certain silazane scavengers for chemically combined hydroxy radicals. In the silanol-terminated polydiorganosiloxane consisting essentially of chemically combined Formula (7) units, the presence of silicon bonded $C_{1-8}$ alkoxy radicals such as methoxy radical is not precluded. The hydroxy radicals which can be removed by the silazane scavenger can be found in materials normally present in the RTV composition of the present invention, for example, trace amounts of water, methanol, silanol radicals on the silica filler (if used), the silanol polymer of Formula (6), or a silanol-terminated polymer having Formula (7) units.

Among the ingredients of the RTV compositions which are formed as a result of the use of the hydroxy scavenger of Formulas (1) to (5), is silanol-free polydiorganosiloxane, chain-terminated with two or three—$OR^{10}$ radicals. The silanol-free polydiorganosiloxane optionally can be combined with an effective amount of a cross-linking silane, as defined hereinafter, under substantially anhydrous conditions. The cross-linking polyalkoxysilane which can be utilized in combination with the scavenging silazane of Formulas (1) to (5) has the formula,

where $R^1$, $R^2$ are as defined below and b is 0 or 1. The preferred condensation catalysts which can be used in the practice of the invention include metal compounds selected from tin compounds, zirconium compounds, and titanium compounds or mixtures thereof. Additional condensation catalysts which can be used are defined more particularly hereinafter.

It is not completely understood why the polyalkoxy-terminated organopolysiloxane compositions of the present invention are stable in the presence of certain condensation catalysts over an extended period of time in the substantial absence of moisture.

A mechanistic study of the RTV of the present invention supports the theory that the use of scavenging silazane of Formulas (1)–(5) above, in accordance with the practice of the invention, minimize the likelihood that detrimental amounts of $R^1OH$ will be generated during the shelf period. $R^1OH$ generation is to be avoided because $R^1OH$ endstops the silanol polymer of Formula (6) or polymer with Formula (7) units to produce polymers having terminal units.

These polymers, wherein the silicon atom at each polymer chain end is terminated with only one alkoxy radical, have slow cure times. In addition, $R^1OH$ can breakdown the organopolysiloxane polymer in the presence of the condensation catalyst.

The use of silazane scavenger substantially eliminates undesirable water in the filler and silicone polymer, as well as residual moisture in the RTV composition during the shelf period. In determining what level of silane scavenger of Formulas (1)–(5) to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and silazane radicals. In compositions which also contain filler and other additives, the additional amount of scavenger of Formulas (1)–(5) which is required is estimated by running a 48-hour stability check at 100° C. to determine whether the tack-free time remains substantially unchanged as compared to the tack-free time of the composition before aging measured under substantially the same conditions.

Where polyalkoxy-terminated polymer of Formula (9) below is made without using silazane scavenger of Formulas (1)–(5), silazane scavenger can be used in the practice of the invention having less than two—$OR^{10}$ radicals but at least one attached to silicon. In such situations, the scavenging silazanes of Formulas (1)–(5) can be used in an amount sufficient to stabilize the RTV composition as previously defined. In addition, there can be used with scavengers of Formulas (1)–(5) at least 0.01 part and up to 10 parts of the cross-linking silane of Formula (8).

The polyalkoxy-terminated organopolysiloxane of the present invention has the formula,

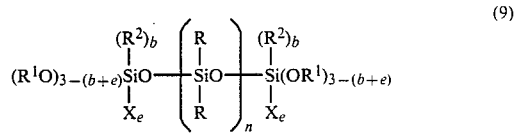

where R, $R^1$, $R^2$ are as defined below and, n and b are as previously defined and e is equal to 0 to 1 and the sum of b+e is equal to 0 to 1, and X is a silazane leaving group. The polyalkoxy-terminated organopolysiloxane of Formula (9) can be made by various procedures. One procedure is taught by Cooper et al., U.S. Pat. No. 3,542,901 involving the use of a polyalkoxysilane with a silanol-terminated polydiorganosiloxane in the presence of an amine catalyst. A method not taught by Cooper et al. is the use of the silane scavengers of Formulas (1)–(5) as an endcapper which silazane compounds have at least three hydrocarbonoxy groups with silanol-terminated polydiorganosiloxane used in the practice of the invention.

In Formulas (6)–(9), R is preferably selected from $C_{1-13}$ monovalent hydrocarbon radicals, halogenated hydrocarbon radicals and cyano alkyl radicals, $R^1$ is preferably a $C_{1-8}$ alkyl radical or a $C_{7-13}$ aralkyl radical, $R^2$ is preferably methyl, phenyl, or vinyl.

The expression "substantially acid-free" with respect to defining the elastomer made from the RTV composition of the present invention upon exposure to atmospheric moisture means yielding by-products having a pKa of 5.5 or greater with 6 or greater preferred and 10 or greater being particularly preferred.

It has been further found that improved cure rates can be achieved if minor amounts of amines, substituted guanidines, or mixtures thereof, are utilized curing accelerators in the polyalkoxy compositions of the present invention. These curing accelerators also serve to catalyze the ability of the silazane leaving group to act as a scavenger. There can be used from 0.1 to 5 parts, and preferably from about 0.3 to 1 part of curing accelerator, per 100 parts of the silanol-terminated polymer of Formula (6), or which consists of chemically combined units of Formula (7), or 100 parts of the polyalkoxy-terminated polymer of Formula (9) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

The RTV compositions of the present invention can cure to a depth of ⅛-inch thickness within 24 hours. Durometer Hardness (Shore A) can then be determined and used to evaluate the cure of the compositions as shown in the examples.

In a further aspect of the present invention, there is provided a stable room temperature vulcanizable polyalkoxy-terminated organopolysiloxane composition curable under ambient conditions to a tack-free, substantially acid-free elastomer comprising, (A) 100 parts of a polyalkoxy-terminated organopolysiloxane of Formula (9);

(B) 0.1 to 10 parts of a cross-linking silazane of Formula (8);

(C) an effective amount of condensation catalyst, and (D) a stabilizing amount of scavenging silane of Formula (1)-(5).

Also included within the scope of the present invention is a method of making a room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises: (1) adding to the silanol-terminated organopolysiloxane a stabilizing amount of a polyalkoxysilazane which is both a scavenger for hydroxy functional groups and a cross-linking agent of the Formula (1)-(5) wherein there is present at least three or four hydrocarbonoxy groups in the molecule of the compound as explained above.

Another method of the present invention is making a room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, which involves the improvement which comprises adding to said polyalkoxy-terminated organopolysiloxane (1) a stabilizing amount of a silazane scavenger for hydroxy functional groups of Formulas (1)-(5).

In an additional aspect of the present invention, there is provided a method of making a stable, one-package room temperature vulcanizable polyalkoxyterminated organopolysiloxane composition which comprises agitating, under substantially anhydrous conditions, a room temperature vulcanizable material selected from (A) a mixture comprising on a weight basis (i) 100 parts of a silanol-terminated polydiorganosiloxane consisting essentially of chemically combined units of Formula (7);

(ii) an amount of silazane of Formulas (1)-(5) sufficient to scavenge available —OH in the RTV composition and provide up to 3% by weight excess, based on the weight of RTV composition, (iii) 0 to 10 parts of the cross-linking silane of Formula (8);

(iv) an effective amount of a condensation catalyst, and (v) 0 to 5 parts of curing accelerator selected from substituted guanidines, amines and mixtures thereof wherein, the condensation catalyst is added after the silanol-terminated polydiorganosiloxane and scavenging silazane are mixed; and (B) a mixture comprising, (i) 100 parts of the polyalkoxy-terminated organopolysiloxane of Formula (9);

(ii) 0 to 10 parts of the cross-linking silane of Formula (8);

(iii) an effective amount of a condensation catalyst;

(iv) a stabilizing amount of silazane scavenger of Formula (1)-(5), and (v) 0 to 5 parts of curing accelerator selected from substituted guanidines, amines and mixtures thereof.

Radicals included within R of Formulas (6), (7), (8) and (9) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included with $R^1$ are, for example, $C_{1-8}$ alkyl radicals, for example, methyl, ethyl, propyl, butyl, pentyl; $C_{7-13}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In Formulas (6)-(9), where R, $R^1$, and $R^2$ can be more than 1 radical, these radicals can be the same or different.

Some of the cross-linking polyalkoxysilanes included within Formula (8) are, for example, methyltrimethoxysilane; methyltriethoxysilane; ethyltrimethoxysilane; tetraethoxysilane; vinyltrimethoxysilane; etc.

Among the curing accelerators which can be used in the practice of the invention are silyl substituted guanidines having the formula,

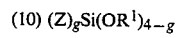

where $R^1$ is as previously defined, Z is a guanidine radical of the formula,

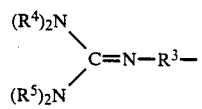

$R^3$ is divalent $C_{2-8}$ alkylene radical, $R^4$ and $R^5$ are selected from hydrogen and $C_{1-8}$ alkyl radicals and g is an integer equal to 1 to 3 inclusive. In addition, alkyl substituted guanidines having the formula

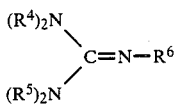

where $R^4$ and $R^5$ are as previously defined and $R^6$ is a $C_{1-8}$ alkyl radical, also can be employed. Some of the silyl substituted guanidines included within Formula (10) are shown by Takago, U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

Silanol-terminated polydiorganosiloxanes of Formula (6), as well as silanol terminated silicone polymers consisting essentially of Formula (7) units are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of Formula (6), or having chemically combined Formula (7) units, also are well known.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg, U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth napthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the silanol-terminated polydiorganosiloxane, which hereinafter will include Formula (6) or polymer consisting essentially of Formula (7) units along with the scavenging silazane of Formulas (1)–(5) and cross-linking silane of Formula (8) with the catalyst, or without the cross-linking silane if there is used an integrated cross-linking agent scavenger where the blending is performed in the substantial absence of atmospheric moisture. Thereafter, the condensation catalyst is added also in the substantial absence of atmospheric moisture.

As used hereinafter, the expressions "moisture-free conditions" and "substantially anhydrous conditions," with reference to making the RTV compositions of the present invention, mean mixing in a dry box, or in a closed container which has been subjected to vacuum to remove air, which thereafter is replaced with a dry inert gas, such as nitrogen. Experience has shown that sufficient scavenging silazane of Formulas (1)–(5) should be utilized as previously defined. Temperatures can vary from about 0° C. to about 180° C. depending upon the degree of blending, the type and amount of filler.

A preferred procedure for making the RTV composition of the present invention is to agitate under substantially anhydrous conditions, a mixture of the silanol-terminated polydiorganosiloxane, filler and an effective amount of an integrated cross-linker-scavenging silazane of Formulas (1)–(5) sufficient to effect the substantial elimination of hydroxy functional radicals and to endcap the polymer. There then can be added to the substantially silanol-free mixture, the condensation catalyst along with other ingredients, for example, the curing accelerator and pigments. A stabilizing excess of the scavenging silazane can be used in the initial or final stages of the mixing procedure if desired in amounts previously defined.

In instances where the polyalkoxy-terminated organopolysiloxane of Formula (7) is made by a procedure not requiring the use of scavenging silane of Formulas (1)–(5), stabilizing amounts of scavenging silazane shown by Formulas (1)–(5) can be used. Here, the scavenging silazane can be added before, with, or after the addition of condensation catalyst. Alternative procedures for making polyalkoxy-terminated organopolysiloxane are shown by Cooper et al., U.S. Pat. No. 3,542,901.

One thing should be noted that the guanidine and amine accelerators may be utilized optionally in the instant case; i.e., the shelf stability and cure rate is improved by the utilization of the accelerators, that is the guanidines, amines, etc. as disclosed above, but the composition will function effectively even without such accelerators. Accordingly, even if those accelerators yield an improved composition, they are not strictly necessary with the integrated cross-linkers and scavengers of the instant case.

The examples given below are given for the purpose of illustrating the present invention. They are not given for any purpose of setting limits or boundaries to the instant invention. All parts in the examples are by weight.

EXAMPLE 1

Into a three-liter, three-necked flask fitted with mechanical stirrer thermometer, reflux condenser and gas inlet tube, there was charged 600 parts of methylchlorodimethoxysilane and 2.0 liters of dry hexane. Ammonia gas was then bubbled through the reaction mixture with agitation until the reaction was completed at room temperature. Ammonium chloride was removed by vacuum filtration and the product was washed with hexane. The hexane solution of the product as well as the hexane wash were combined and the resulting solution was vacuum distilled on a flash rotary evaporator to yield the desired product—dimethyltetramethoxydisilazane. The product was finally distilled at 66°–68° C. at 5 mm Hg to yield 334 grams of the clear disilazane.

There was then prepared a one-component RTV mixture. First, there was mixed at 15 minutes at room temperature, 100 parts of a silanol-terminated diorganopolysiloxane polymer of 3,000 centipoise viscosity at 25° C. to which was added 0.35 parts of n-dihexylamine, 3.0 parts of dimethyltetramethoxydisilazane and 0.1 to 0.5 parts of methyltriacetoxysilane. To this first mixture, there was added and mixed into it for fifteen minutes, 0.25 parts of dibutyltindiacetate and 1.0 parts of a trimethylsiloxy endstopped dimethylpolysiloxane fluid of 50 centipoise viscosity at 25° C. This fluid was a plasticizer. After mixing, the RTV composition was packed into sealed aluminum tubes and stored for twenty-four hours at 100° C. and forty-eight hours at 100° C. prior to exposure to room temperature curing. Speed and degree of cure were determined by tack-free time. The results are set forth in Table 1 below. The results are given for the different levels of methyltriacetoxysilane that was utilized in the composition. The methyltriacetoxysilane was utilized as an endcapping catalyst in the composition as is explained in co-pending Chung Docket, 60Si-613. The results are set forth in Table 1 below.

TABLE 1

| Level (g.) $CH_3Si(OAc)_3$ | Initial | R.T./24 hrs. | TFT (min.) 100°/24 hours | 100°/48 hours |
|---|---|---|---|---|
| 0 | 15 | Gelled | 15 | — |
| 0.1 | 15 | 30 | 10 | 30 |
| 0.2 | 45 | 40 | — | 15 |
| 0.3 | 45 | 40 | — | 15 |
| 0.4 | 45 | 40 | — | 15 |
| 0.5 | 45 | 40 | — | 15 |

EXAMPLE 2

Following the procedure of Example 1, there was then mixed 100 parts of a silanol endstopped dimethylpolysiloxane polymer of 3,000 centipoise viscosity at 25° C. which was endcapped with dimethoxy groups for the most part and in which there was present 0.3 parts of n-dihexylamine and as a curing accelerator, 1.0 parts of dimethyltetramethoxydisilazane as the integrated cross-linker and scavenging agent, 0.1 parts of methyltriacetoxy silane as the condensation catalyst, 0.25 parts of dibutyltindiacetate, and 1.0 parts of the trimethylsiloxy endstopped dimethylpolysiloxane fluid of 50 centipoise viscosity at 25° C. of Example 1. It should be noted that the fluid of this example which was the same as that of Example 1 contained anywhere from 100 to 500 ppm of silanol in it as a result of the procedure by which it was made. Desirably, it should contain no silanol in it. However, by most procedures by which this fluid is obtained, the result is the fact that such fluids do contain some silanol in them. This is one of the reasons why it is necessary to include a scavenger in such compositions. The same compound and procedure was utilized as in Example 1 in this case. After the composition was obtained, then it was subjected to determining tack-free time, both with and without a silazane.

This test with and without a silazane was to determine the effectiveness of methyltriacetoxysilane as a catalyst in the endcapping reaction, i.e., the endcapping of the silanol endstopped dimethylpolysiloxane polymer with the integrated cross-linking agent scavenger, dimethyltetramethoxydisilazane. Normally, an amine is utilized as the endcapping catalyst as was explained above and is explained in the White et al. Ser. No. 277,524, filed on June 26, 1981, U.S. Pat. No. 4,395,526 but in this case the use of n-dihexylamine was tested as contrasted with the use of methyltriacetoxysilane as a catalyst in the endcapping reaction. As noted from the data below, the initial sample and the accelerated aged sample, both types of endcapper catalyst yielded compositions with good shelf-aging. That is, the composition had a good tack-free time irrespective of which endcapping catalyst was utilized. With respect to the instant invention, there is disclosed that the instant endcapping scavenger can be utilized both as an integrated cross-linking agent and as a scavenger and will result in a composition with shelf-aging properties. Tack-free time is a measure of the shelf stability of the composition since if the composition has a good tack-free time, i.e., a tack-free time that gives the composition a good work life, the composition will still cure in a reasonable amount of time such that a period of time does not exceed 90 minutes. Such a composition as stated has a good work life but will cure in an appropriate period of time after accelerated shelf aging so as to be considered a shelf-stable composition.

EXAMPLE 3

There was taken a three-liter, three-necked flask fitted with a mechanical stirrer, thermometer, reflux condenser and gas inlet tube which was charged with 2 liters of dry hexane and 500 g of vinylchlorodimethoxysilane. Ammonia gas was then bubbled through the reaction mixture with agitation until the reaction was completed at room temperature. Ammonium chloride was removed by vacuum filtration and the product was washed with hexane. The hexane of the reaction mixture as well as the washed hexane were combined and then the hexane was distilled off in a flash rotaty evaporator to yield a cured pale yellow liquid of 327 parts by weight which distilled at 24° C. at 4 mm of Hg. This material was divinyltetramethoxydisilazane.

Such a material was taken and compounded into a one-component RTV composition. Such composition was prepared by first taking and mixing for fifteen minutes at room temperature, 100 parts of the silanol end-stopped dimethylpolysiloxane polymer of Example 1, 0.3 parts of n-dihexylamine and 2 to 4 parts as indicated in the Table II below of divinyltetramethoxydisilazane. To this first mixture which was mixed for fifteen minutes at room temperature, there was added a second mixture which set for fifteen minutes at room temperature, containing 0.2 parts of dibutyltinacetate and 0.8 parts of a trimethylsiloxy endstopped dimethylpolysiloxane fluid of 50 centipoise viscosity at 25° C. which is present as plasticizer. The two mixing steps in both Example 1, 2 and the present example, are necessary because the dibutyltindiacetate will cause an undesirable increase in viscosity if it is added during the first step. This viscosity increase is the result of some silanol condensation catalyzed by the dibutyltindiacetate. This does not occur if the chain capping agent is added first and allowed to react.

The results of both initial and accelerated tack-free time are shown in Table II below.

TABLE II

| Concentration | Compound | |
|---|---|---|
| 100 g. | silanol polymer | first mix |
| 0.3 g. | n-dihexylamine | 15 min. at R.T. |
| 2-4 g. | divinyltetramethoxydisilazane | |
| 0.2 g. | Bu₂Sn(OAc)₂ | second mix |
| 0.8 g. | trimethylsiloxy chain stopped dimethlypolysiloxane of 50 cps. at 25° C. | 15 min. at R.T. |

| Divinyltetra-methoxydi-silazane Level (g.) | TFT (Min.) | | | |
|---|---|---|---|---|
| | Initial | R.T. 24 hrs. | 100°/24 hrs. | 100°/48 hrs. |
| 2 | 15 | 20 | 15 | 36 |
| 3 | 10 | 20 | 25 | 45 |
| 4 | 10 | 20 | 35 | 60 |

As the results of Table II indicate, there is obtained shelf-stable composition, both initially and after accelerated shelf aging with a reasonably short tack-free time with the use of an amine coupling catalyst and with the use of divinyltetramethoxydisilizane as a scavenger and cross-linking agent.

EXAMPLE 4

There was prepared a composition containing:

| | Parts by Weight |
|---|---|
| Base composition A | |
| 150,000 cps. at 25° C. silanol terminated dimethylpolysiloxane = | 100 |
| 100 cps. at 25° C. trimethylsilyl terminated dimethylpolysiloxane containing 1000 ppm OH = | 35 |
| Hydrocarb 95 T (stearic acid treated calcium carbonate from OMYA, Inc.) = | 180 |
| M, D, T, OH fluid containing approximately 3 mole % trimethylsiloxy units, 72 mole % dimethylsiloxy units, 25 mole % methylsiloxy units and approximately 0.5 weight silanol = | 10 |
| Hydroxy containing polyether = | 0.2 |
| Catalyzed Composition A | |
| In a first mixing step there was mixed in above Base Composition | 100 |
| [(CH₃Si(O—CH₃)₂]₂ N—H | 3.0 |

As in Example 3 in a second mixing step, there was mixed to catalyzed composition A:

| | |
|---|---|
| aminoethylaminopropyltrimethoxysilane = | 1.0 |
| di-n-hexylamine = | 0.5 |
| di-butyltindiacetate = | 0.075 |

Initial tack free time—16 minutes
Accelerated age tack free time after 48 hours at 100° C.—16 minutes
5 Day Cured Physical Properties

| | |
|---|---|
| Shore A, hardness = | 25 |
| Tensile, psi = | 264 |
| Elongation, % = | 225 |
| 50% Modulus, psi = | 50 |
| 75% Modulus, psi = | 73 |
| 100% Modulus, psi = | 102 |

CONCLUSION

As can be seen from the initial and accelerated aged tack free times, no change was observed; thus, indicating that the sealant is stable.

EXAMPLE 5

| | Parts by Weight |
|---|---|
| Base Composition A | |
| 150,000 cps. at 25° C. silanol terminated dimethylpolysiloxane = | 100 |
| 100 cps. at 25° C. trimethylsilyl terminated dimethylpolysiloxane containing 1000 ppm OH = | 35 |
| Hydrocarb 95 T (stearic acid treated calcium carbonate from OMYA, Inc.) = | 180 |
| M, D, T, OH fluid containing approximately 3 mole % trimethylsiloxy units, 72 mole % dimethylsiloxy units, 25 mole % | |

| | Parts by Weight |
|---|---|
| methylsiloxy units and approximately 0.5 weight silanol = | 10 |
| Hydroxy containing polyether = | 0.2 |
| Catalyzed Composition | |
| In the first catalyzation step, there was added to above Base Composition A described in Example 4 = | 100 |
| [CH$_3$Si(O—CH$_3$)]$_2$N—H | 3 |
| methyltriacetoxysilane = | 0.1 |

In a second catalyzation step, there was added to the above mixture the following:

| | Parts by Weight |
|---|---|
| aminoethylaminopropyltri methoxysiloxane = | 1.0 |
| di-n-hexylamine = | 0.5 |
| dibutyltindiacetate = | 0.075 |

Initial tack free time—15 minutes
Accelerated tack free time after 48 hours at 100° C.—14 minutes
5 Day Cured Physical Properties

| | |
|---|---|
| Shore A, hardness = | 22 |
| Tensile, psi = | 260 |
| Elongation, % = | 220 |
| 50% Modulus, psi = | 48 |
| 75% Modulus, psi = | 69 |
| 100% Modulus, psi = | 97 |

CONCLUSION

Good shelf-aging sealant was once again obtained. It should be noted that in Example 4, methyltriacetoxysilane or acetic acid was not necessary to catalyze the termination of the polymer to obtain shelf stable material. It is felt that the residual stearic acid present on the calcium carbonate filler is sufficient to catalyze the chain capping reaction by the [CH$_3$Si(O-CH$_3$)$_2$]$_2$ N-H.

The application rates (extrusion rates) of sealants prepared in Examples 4 and 5 were 80 grams per minute and 65 grams per minute respectively; thus, indicating the absence of gellation.

EXAMPLE 6

Base Composition C was prepared containing the following ingredients:

| | Parts by Weight |
|---|---|
| 150,000 cps. silanol terminated dimethylpolysiloxane = | 100 |
| M, D, T, OH fluid (same as in Example 4 = | 35 |
| Trimethylsilyl terminated dimethylpolysiloxane having a viscosity of 2000 cps. at 250° C. = | 15 |
| Stearic acid treated calcium carbonate (Hydrocarb 95 T) = | 180 |
| Catalyzed Composition | |
| The above base composition C was = | 100 |
| mixed with [CH$_3$Si(O—CH$_3$)]$_2$N—H = | 3 |
| in a first catalyzation step. In a second mixing step, there was mixed dibutyltindiacetate = | 0.075 |
| aminoethylaminopropyltri- methoxysilane = | 1.0 |

| | Parts by Weight |
|---|---|
| di-n-hexylamine = | 0.5 |

There was used two mixing steps in Examples 4, 5, and 6 as in Example 3 for the same reasons.

| 5 Day Cured Physical Properties | Initial | Accelerated age after 72 hrs/100° C.* |
|---|---|---|
| Shore A, hardness | 30 | 30 |
| Tensile, psi | 227 | 190 |
| Elongation, % | 260 | 200 |
| 50% Modulus, psi | 51 | 54 |
| 75% Modulus, psi | 69 | 74 |
| 100% Modulus, psi | 91 | 98 |

*These are cured properties after exposing the uncured sealant in a sealed aluminum tube to 72 hours/100° C. for accelerated aging determination.

CONCLUSIONS

Shelf-stable sealant was again obtained using the stearic acid treated calcium carbonate.

EXAMPLE 7

There was taken a three-liter, three necked flask fitted with a mechanical server, thermometer, reflux condenser and gas inlet tube which was charged with two liters of dry hexane and 437 g. of methyl dichloromethoxysilane. Ammonia gas was then bubbled through the reaction mixture with good agitation until the reaction was completed at room temperature. Ammonium chloride removed by vacuum filtration, and the product, was washed with hexane from the ammonium filter cake. The combined hexane solution was distilled off on a flash rotary evaporator to yield a pale, yellow liquid product, a mixture of tricyclic-and tetracyclic silazane, of 135 g.

The formation of the RTV composition and results are shown below:

| Parts by weight | | |
|---|---|---|
| 100 | silanol stopped dimethyl- polysiloxane polymer | First Mix 15 minutes/ R.T. |
| 4.0 | cyclotri- and tetrasilazane | |
| 0.3 | n-dihexylamine | |
| 0.2 | Bu$_2$Sn(OAc)$_2$ | Second Mix 15 minutes/ R.T. |
| 0.8 | trimethylsiloxy end stopped dimethylpolysiloxane of 50 cps. at 25° C. | |
| TFT (min.) | | |

| Initial | R.T./24 hrs. | 100° C./24 hrs. | 100° C./48 hrs. |
|---|---|---|---|
| 15 | 10 | 15 | 15 |

EXAMPLE 8

Lineary Methoxy Silazanes of the general formula:

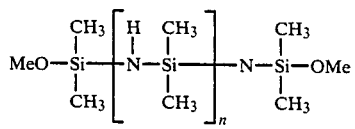

were prepared with n=0—3.

A suitable mixer equipped with a vacuum line and nitrogen purge was charged with 100 parts by weight of methyldimethoxy capped polydimethoxysiloxane polymer of 120,000 centipoise viscosity at 25° C. with 0.6% by weight of di-n-hexylamine, 17 parts of cyclooctamethyltetrasiloxane treated fumed silica filler, 20 parts of a silanol containing trimethylsiloxy endstopped dimethylpolysiloxane fluid of 100 centipoise viscosity at 25° C., 10 parts by weight of a silanol containing fluid having 20 mole percent of monomethylsiloxy units, 76 mole percent of dimethylsiloxy units, and 4 mole percent of trimethyl siloxy units with 0.5 mole percent silanol groups, and 0.2 parts of polyether as a thixotrope which is sold under the trade name of UCON LB-1145 which is a tradename of a polyether sold by the Union Carbide Corporation, Connecticut.

This mixture was agitated under vacuum (22 mm Hg) at room temperature for two hours to give an RTV base. To this base was added 0, 0.5, and 1.0 parts of the linear methoxy silazane above, 1.0 parts 3-(2-aminoethylamino)propyltrimethoxysilane, and 0.5 part methyltrimethoxysilane. Following a 15-minute mix at room temperature using a SemKit ® mixer, a solution comprised of 1 part 3(-2-aminoethylamino)propyltrimethoxysilane and 0.2 parts of dibutyltindiacetate was added to the RTV composition followed by a second 15-minute mix at room temperature using a SemKit ® mixer.

Following mixing, the material was placed in sealed aluminum tubes and stored for 24 hours at room temperature, and 48 hours at 100° C. After aging, the material was made into ASTM sheets and allowed to cure three days at room temperature and 50% relative humidity. After curing, a physical property profile to illustrate the properties of the composition. The flow rate of the uncured mixture was tested with a flow test jig as described in military specification MIL-A-46106A. Flow measurement was taken after 3 minutes.

Constant Temperature Bath at 23°±1° C.
SemKit ® Mixer.

Procedure

Sample is checked for temperature; if above 23°±1° C. stae, the sample is held until the proper temperature is obtained.

There was installed the stainless steel nozzle into the cartridge and there was inserted the cartridge into the Semco gun and connected it to 90±0.5 psi air source.

Then there is extruded a few grams of sealant to clean any entrapped air and to fill the nozzle.

There is extruded the sealant into a tared container for exactly 15 seconds. Care must be taken to start and stop the air pressure precisely on time to insure a 15 second spacer.

The tared cup is weighed with extruded sealant to determine weight of 15 second extruded sealant. Multiply 15 sec. weight by (4) to obtain 60 sec. extruded weight. Application rate is reported in gm/min.

Tack Free Time

Determine by simple finger touch test.
Utilizing these tests, the following data was obtained.

TABLE I

| | Linear Methoxy Silazane Level | | |
|---|---|---|---|
| Property (24 hr. RT Storage) | 0 pt. | 0.5 pt. | 1.0 pt. |
| Flow, inch | 0.25 | 0.20 | 0.30 |
| Application Rate, g/min. | 143 | 160 | 146 |
| Specific Gravity | 1.034 | 1.034 | 1.034 |
| Tack Free Time, min. | 35 | 30 | 30 |

The physical property profile of the composition was also obtained for the various accelerated and unaccelerated shelf aged samples. The results are set forth in Table II below.

TABLE II

| | 0 pt. Silazane | | 0.50 pt. Silazane | | 1.0 pt. Silazane | |
|---|---|---|---|---|---|---|
| Property | RT | 48 hr/100° C. | RT | 48 hr/100° C. | RT | 48 hr/100° C. |
| Hardness, Shore A | 13 | Gelled in | 10 | Gelled in | 10 | 10 |
| Tack Free Time | 30 | storage | 30 | storage | 30 | 75 |
| Tensile Strength (psi) | 215 | tube | 189 | tube | 183 | 167 |
| Elongation (%) | 748 | | 663 | | 643 | 730 |
| Modulus (50%) | 25 | | 27 | | 26 | 26 |
| Modulus (10%) | 35 | | 38 | | 38 | 34 |

APPLICATION RATE

The equipment necessary for the application rate test is as follows:

Equipment

Semco #250 Sealant Gun
Semco #250-C6 6 oz. polyethylene cartridges and #250 polyethylene plungers.
Compressed Air Source with Regulator, 90±0.5 psig.
Stainless Steel Nozzle—2.000±0.005" length×0.54±0.005" diameter. Center bored 0.1990"±0.0005" hole. Threaded with ½" pipe thread at one end, ½" length.
Centigrade Thermometer
Stopwatch
Aluminum Dishes—2⅜" dia.×⅝" deep.
Balance—capable of weighing to 0.1 gm. accuracy.
Standard Conditions: 73°±3° F., 50–100% R.H.

What we claim is:

1. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:

(A) an organopolysiloxane wherein the silicon atom at each polymer chain end is terminated with at least two alkoxy radicals;

(B) an effective amount of condensation catalyst; and (C) a stabilizing amount of scavenger for hydroxy functional groups selected from the group consisting of:

$$\begin{array}{c} OCH_3 \quad H \quad OCH_3 \\ | \quad\quad | \quad\quad | \\ CH_3-Si-\!\!-\!\!-N-Si-CH_3, \\ | \quad\quad\quad\quad | \\ CH_3 \quad\quad CH_3 \end{array}$$

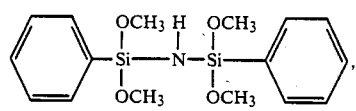

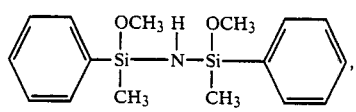

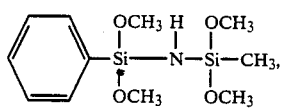

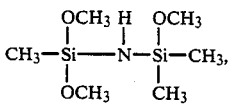

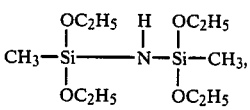

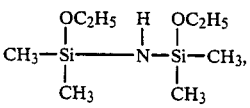

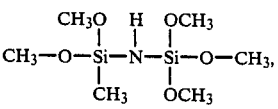

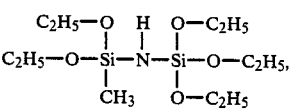

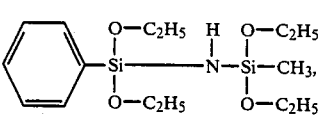

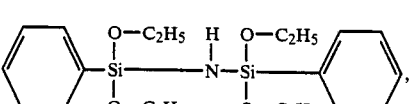

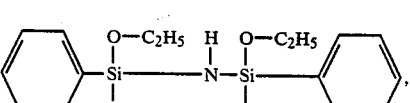

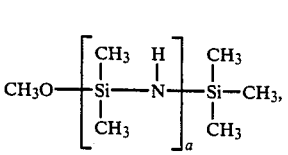

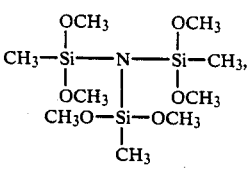

a = 1–5 and mixtures thereof divinyltetramethoxydisilazane,
1-Methyl-3-ethyl-1,1,3,3-tetramethoxydisilazane,
1,3-Diethyl-1,1,3,3-tetramethoxydisilazane,
1-Methyl-3-propyl-1,1,3,3-tetramethoxydisilazane,
1-Ethyl-3-propyl-1,1,3,3-tetramethoxydisilazane,
1,3-Dipropyl-1,1,3,3-tetramethoxydisilazane,
1,1,3-Trimethyl-1,3,3-trimethoxydisilazane,
1,1-Dimethyl-3-ethyl-1,3,3-trimethoxydisilazane,
1,1-Dimethyl-3-propyl-1,3,3-trimethoxydisilazane,
1,1-Dimethyl-3-butyl-1,3,3-trimethoxydisilazane,
1,1-Diethyl-3-methyl-1,3,3-trimethoxydisilazane,
1,1-Dipropyl-3-methyl-1,3,3-trimethoxydisilazane,
1,1-Dibutyl-3-methyl-1,3,3-trimethoxydisilazane,
1,1,3-Trimethyl-1,3,3-trimethoxydisilazane,
1,1,3-Triethyl-1,3,3-trimethoxydisilazane,
1,1,3-Tripropyl-1,3,3-Trimethoxydisilazane,
1,1-Dimethyl-1,3,3,3-Tetramethoxydisilazane,
1,1-Diethyl-1,3,3,3-Tetramethoxydisilazane,
1,1-Dipropyl-1,3,3,3-Tetramethoxydisilazane,
1,3-Dimethyl-1-ethoxyl-1,3,3-trimethoxydisilazane,
1,3-Diethyl-1-ethoxy-1,3,3-trimethoxydisilazane,
and cyclic silazane scavengers having at least one or all of the units of the formula:

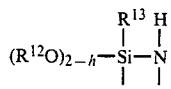

and the rest of the units, if any, having the formula:

where h is 0 or 1, $R^{12}$ is a $C_{1-8}$ aliphatic organic radical selected from the group consisting of alkyl, alkylether, alkylester, alkylketone, alkyl cyano, and aryl and $R^{13}$ and $R^{14}$ is a $C_{1-8}$ monovalent substituted or unsubstituted hydrocarbon radical.

2. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:

(A) an organopolysiloxane wherein the silicon atom at each polymer chain end is terminated with at least two alkoxy radicals;

(B) an effective amount of condensation catalyst; and (C) a stabilizing amount of scavenger for hydroxy functional groups selected from the group consisting of:

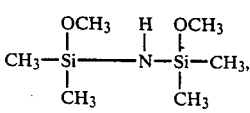

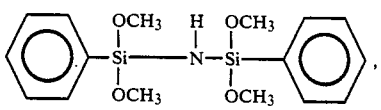

-continued

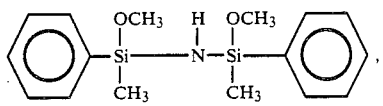

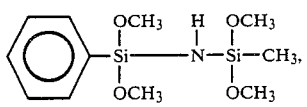

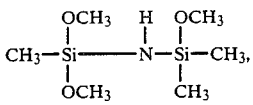

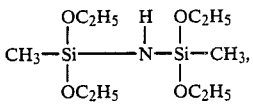

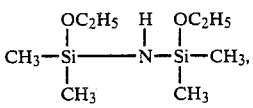

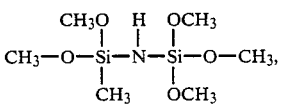

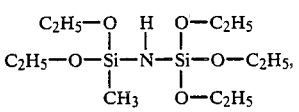

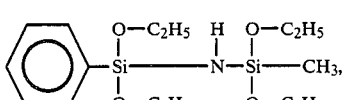

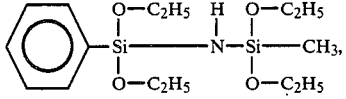

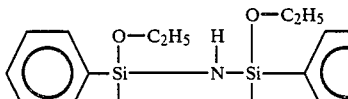

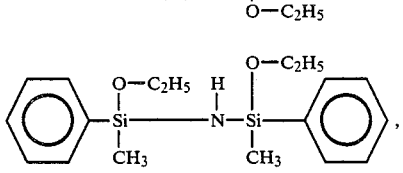

a = 1-6 and mixtures thereof

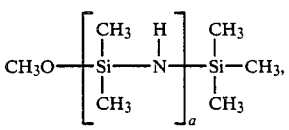

divinyltetramethoxydisilazane,
1-Methyl-3-ethyl-1,1,3,3-tetramethoxydisilazane,
1,3-Diethyl-1,1,3,3-tetramethoxydisilazane,
1-Methyl-3-propyl-1,1,3,3-tetramethoxydisilazane,
1-Ethyl-3-propyl-1,1,3,3-tetramethoxydisilazane,
1,3-Dipropyl-1,1,3,3-tetramethoxydisilazane,
1,1,3-Trimethyl-1,3,3-trimethoxydisilazane,
1,1-Dimethyl-3-ethyl-1,3,3-trimethoxydisilazane,
1,1-Dimethyl-3-propyl-1,3,3-trimethoxydisilazane,
1,1-Dimethyl-3-butyl-1,3,3-trimethoxydisilazane,
1,1-Diethyl-3-methyl-1,3,3-trimethoxydisilazane,
1,1-Dipropyl-3-methyl-1,3,3-trimethoxydisilazane,
1,1-Dibutyl-3-methyl-1,3,3-trimethoxydisilazane,
1,1,3-Trimethyl-1,3,3,-trimethoxydisilazane,
1,1,3-Triethyl-1,3,3-trimethoxydisilazane,
1,1,3-Tripropyl-1,3,3-Trimethoxydisilazane,
1,1-Dimethyl-1,3,3,3-Tetramethoxydisilazane,
1,1-Diethyl-1,3,3,3-Tetramethoxydisilazane,
1,1-Dipropyl-1,3,3,3-Tetramethoxydisilazane,
1,3-Dimethyl-1-ethoxyl-1,3,3-trimethoxydisilazane,
1,3-Diethyl-1-ethoxy-1,3,3-trimethoxydisilazane,
and cyclic silazane scavengers having at least one or all of the units of the formula:

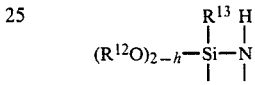

and the rest of the units, if any, having the formula:

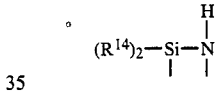

where h is 0 or 1, $R^{12}$ is a $C_{1-8}$ aliphatic organic radical selected from the group consisting of alkyl, alkylether, alkylester, alkylketone, alkyl cyano, and aryl and $R^{13}$ and $R^{14}$ is a $C_{1-8}$ monovalent substituted or unsubstituted hydrocarbon radical and (D) an effective amount of a curing accelerator consisting of an amine or mixture of amine.

3. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:

(A) 100 parts of substantially silanol-free polyalkoxysiloxydiorganopolysiloxane of the formula:

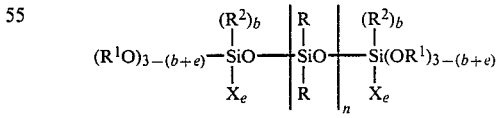

wherein R is selected from $C_{1-13}$ monovalent hydrocarbon radicals, halogenated hydrocarbon radicals or cyanoalkyl radicals; $R^1$ is selected from $C_{1-8}$ alkyl radicals or $C_{7-13}$ aralkyl radicals; $R^2$ is selected from methyl, phenyl or vinyl; X is a silazane leaving group; e is 0 or 1 and b+e is 0 or 1, (B) 0 to 10 parts of a cross-linking polyalkoxy silane of the formula:

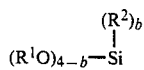

where $R^1$ and $R^2$ are defined above and b is 0 or 1,
(C) an effective amount of a condensation catalyst,
(D) a stabilizing amount of scavenger for hydroxy functional groups selected from the group consisting of:

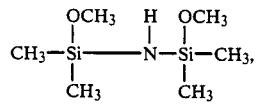

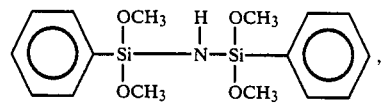

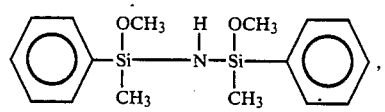

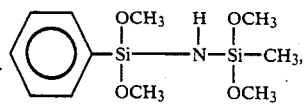

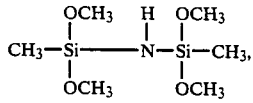

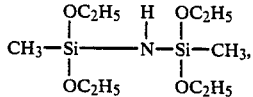

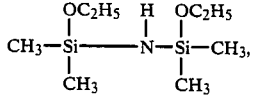

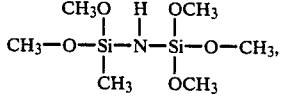

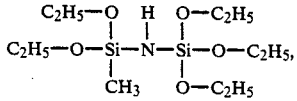

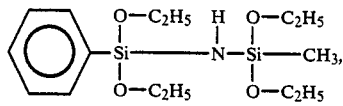

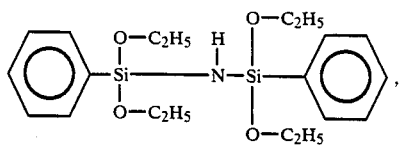

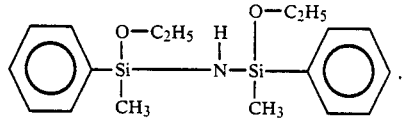

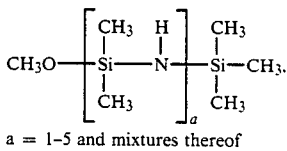

a = 1–5 and mixtures thereof

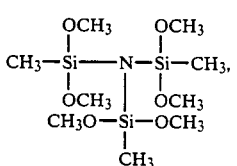

and cyclic silazanes scavengers having at least one or all of the units of the formula:

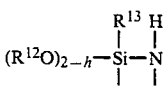

and the rest of the units, if any, having the formula:

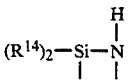

where h is 0 or 1, $R^{12}$ is a $C_{1-8}$ aliphatic organic radical selected from the group consisting of alkyl, alkylether, alkylester, alkylketone, alkyl cyano, and aryl and $R^{13}$ and $R^{14}$ is a $C_{1-8}$ monovalent substituted or unsubstituted hydrocarbon radical; and
(E) 0.1 to 5 parts of a curing accelerator consisting of an amine or mixture of amines.

4. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:
(A) an organopolysiloxane wherein the silicon atom at each polymer chain end is terminated with at least two alkoxy radicals;
(B) an effective amount of condensation catalyst; and
(C) a stabilizing amount of scavenger for hydroxy functional groups having the general formula:

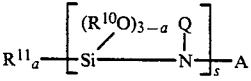

wherein $R^{10}$ is a $C_{1-8}$ aliphatic organic radical selected from the group consisting of alkyl, alkylether, alkylester, alkylketone and alkylcyano or aryl; $R^{11}$ is a $C_{1-8}$ monovalent substituted or unsubstituted hydrocarbon radical; Q is selected from hydrogen, $C_{1-8}$ monovalent substituted hydrocarbon radicals or radicals of the formula:

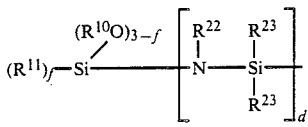

where $R^{10}$ and $R^{11}$ are as previously defined; a varies from 0 to 2; f varies from 0 to 3; s is a whole number that varies from 1 to 25; d is a whole number that varies from 1 to 25; $R^{22}$ is selected from hydrogen or $C_{1-8}$ monovalent hydrocarbon radicals; $R^{23}$ is independently selected from $C_{1-8}$ hydrocarbon or hydrocarbonoxy radicals; A is a radical of the formula:

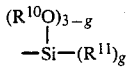

where $R^{10}$ and $R^{11}$ are as previously defined; g varies from 0 to 3; and in the above scavengers there is at least one hydrocarbonoxy group in the molecule.

5. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:
  (A) an organopolysiloxane wherein the silicon atom at each polymer chain end is terminated with at least two alkoxy radicals;
  (B) an effective amount of condensation catalyst; and
  (C) a stablizing amount of scavenger for hydroxy functional groups having the general formula:

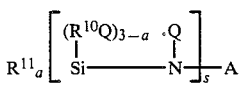

where $R^{10}$ is a $C_{1-8}$ aliphatic organic radical selected from the group consisting of alkyl, alkylether, alkylester, alkylketone and alkylcyano or aryl; $R^{11}$ is a $C_{1-8}$ monovalent substituted or unsubstituted hydrocarbon radical; Q is a radical of the formula:

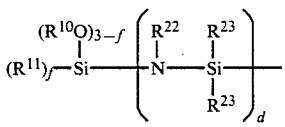

where $R^{10}$ and $R^{11}$ are as previously defined; a varies from 0 to 2; f varies from 0 to 3; s is a whole number that varies from 1 to 25; d is a whole number that varies from 1 to 25; $R^{22}$ is selected from hydrogen or $C_{1-8}$ monovalent hydrocarbon radicals; $R^{23}$ is independently selected from $C_{1-8}$ hydrocarbon or hydrocarbonoxy radicals; A is selected from the group consisting of hydrogen, $C_{1-8}$ monovalent substituted hydrocarbon radicals, $C_{1-8}$ monovalent unsubstituted hydrocarbon radicals and radicals of the formula:

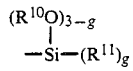

where $R^{10}$ and $R^{11}$ are as previously defined; g varies from 0 to 3; and in the above scavengers there is at least one hydrocarbonoxy group in the molecule.

6. The composition of claim 1 wherein the scavenger is a cyclic silazane where $R^{12}$, $R^{13}$, and $R^{14}$ are methyl.

7. The composition of claim 2 wherein the scavenger is a cyclic silazane where $R^{12}$, $R^{13}$, and $R^{14}$ are methyl.

8. A one-package, room temperature vulcanizable organopolysiloxane composition in accordance with claim 1, where the polyalkoxy-terminated organopolysiloxane has the formula,

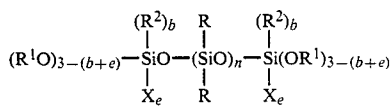

where R is a $C_{1-13}$ monovalent substituted or unsubstituted hydrocarbon radical, $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, X is a silazane hydrolyzable leaving group, and b is a whole number equal to 0 or 1, e is a whole number equal to 1 or 1 inclusive, and the sum of $b+e$ is equal to 0 or 1 inclusive, and n is an integer having a value of from about 50 to about 2500, inclusive.

9. A room temperature vulcanizable composition in accordance with claim 1 having an effective amount of a cross-linking silane of the formula,

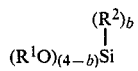

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, and b is a whole number equal to 0 or 1.

10. A room temperature vulcanizable composition in accordance with claim 1, which contains a tin compound as the condensation catalyst.

11. A room temperature vulcanizable composition in accordance with claim 8, where R, $R^1$ and $R^2$ are methyl and which has a tin compound as a condensation catalyst.

12. An RTV composition in accordance with claim 2 wherein the condensation catalyst is dibutyltindiacetate.

13. An RTV composition in accordance with claim 2 further comprising a polymethoxysilane cross-linking agent.

14. The composition of claim 3 wherein the scavenger is a cyclic silazane where $R^{12}$, $R^{13}$, and $R^{14}$ are methyl.

15. A one-package room temperaure vulcanizable composition in accordance with claim 3 wherein R, $R^1$ and $R^2$ are methyl.

16. A one-package room temperature vulcanizable composition in accordance with claim 3 wherein the condensation catalyst is a tin compound.

17. A one-package room temperature vulcanizable composition in accordance with claim 3 where the polyalkoxysilane is methyltrimethoxysilane.

18. A one-package RTV composition in accordance with claim 3 where the amine is butyltetramethylguanidine.

19. A composition in accordance with claim 3 where the condensation catalyst is dibutyltindiacetate.

20. A room temperature vulcanizable composition in accordance with claim 18 having an effective amount of di-n-hexylamine curing accelerator.

* * * * *